United States Patent [19]

Schmidt

[11] 4,332,045

[45] Jun. 1, 1982

[54] METHOD AND APPARATUS FOR ECONOMICALLY MAINTAINING AND BREEDING BEES IN A BEE COMPOUND UNIT

[75] Inventor: Matthias Schmidt, Mosbach, Fed. Rep. of Germany

[73] Assignee: imka Forschungsgesellschaft fur Bienenzucht mbH, Stuttgart, Fed. Rep. of Germany

[21] Appl. No.: 183,845

[22] Filed: Sep. 3, 1980

[30] Foreign Application Priority Data

Sep. 6, 1979 [DE] Fed. Rep. of Germany ....... 2935934

[51] Int. Cl.³ ...................... A01K 47/06; A01K 57/00
[52] U.S. Cl. .................................. 6/1; 6/5; 6/7
[58] Field of Search ...................... 6/1, 2 R, 4 A, 4 R, 6/5, 4 B, 7, 9, 10, 11

[56] References Cited

U.S. PATENT DOCUMENTS

| | | | |
|---|---|---|---|
| 271,197 | 1/1883 | Fife et al. | 6/5 |
| 302,834 | 7/1884 | Franklin | 6/2 R |
| 1,410,444 | 3/1922 | Aspinwall | 6/2 R |
| 3,426,374 | 2/1969 | Johne | 6/4 R X |
| 3,864,196 | 2/1975 | Schmidt | 6/11 |
| 4,199,832 | 4/1980 | Glasscock et al. | 6/1 |
| 4,241,467 | 12/1980 | Pannell | 6/1 |

FOREIGN PATENT DOCUMENTS 510953  5/1952  Belgium .................................. 6/11

*Primary Examiner*—Gene Mancene
*Assistant Examiner*—Robert P. Swiatek
*Attorney, Agent, or Firm*—Sandler & Greenblum

[57] ABSTRACT

Bees are maintained and bred within a bee compound unit comprising a plurality of compartments that surround and are connected to a central assembly chamber associated with a feeding chamber. Each of the compartments is adapted to house a swarm of bees and one queen bee. Accordingly, bees in an individual compartment are only indirectly accessible to bees in another compartment via the central chamber and can move from one compartment to another only after congregating in the assembly chamber in order to gain access to the feeding chamber associated with the assembly chamber. The bees in all of the compartments can be cared for and treated only in one of the compartments by removing combs with swarming bees from the one compartment and replacing them with empty combs.

22 Claims, 4 Drawing Figures

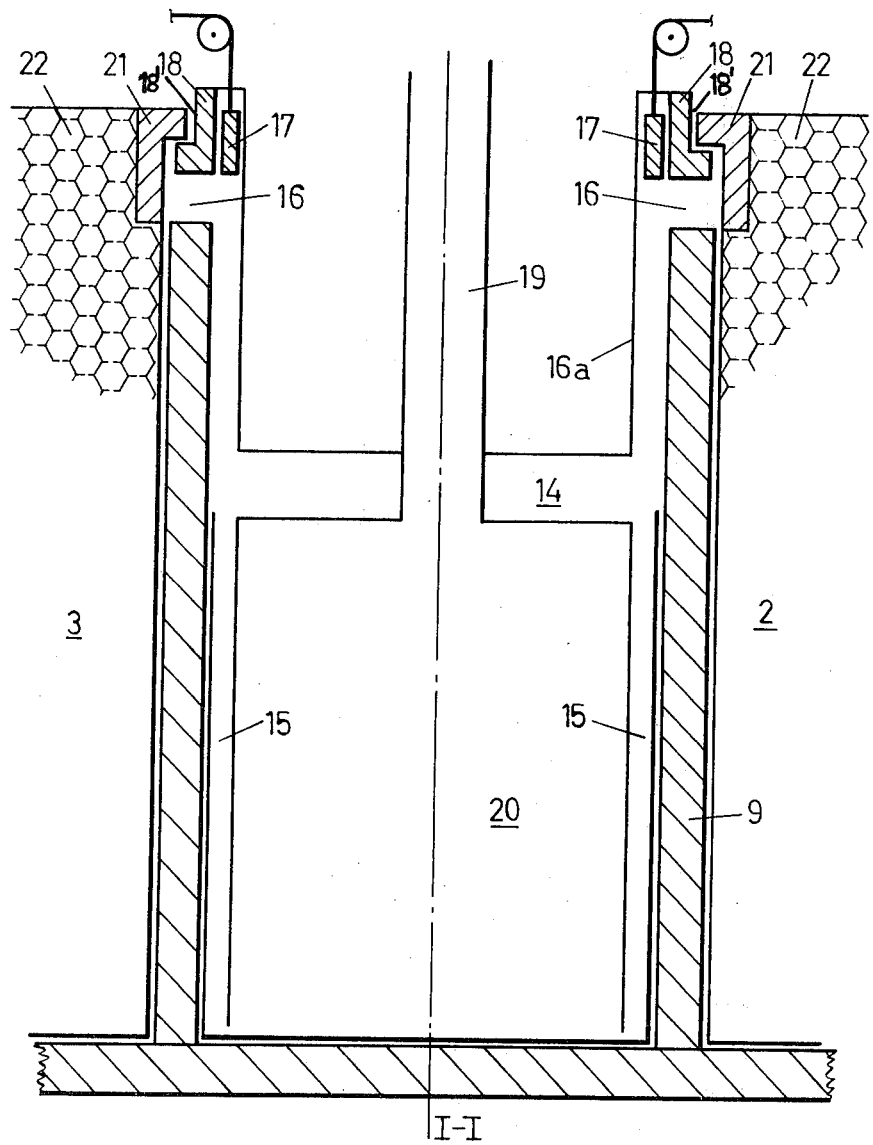

METHOD AND APPARATUS FOR ECONOMICALLY MAINTAINING AND BREEDING BEES IN A BEE COMPOUND UNIT

BACKGROUND OF THE INVENTION

1. Field of the Invention

The present invention generally relates to a method of and apparatus for maintaining and feeding of bees within a compound unit and more specifically to a method of and apparatus for maintaining, breeding and feeding bees within a compound unit in which a beekeeper need care for bees within only one of the compartments of the compound.

2. Discussion of Prior Art

Generally, individual bee swarms are maintained separately within a bee house or compound and treated individually by a beekeeper. Treating the bees entails feeding, caring for, dividing and otherwise maintaining the bees. Separately maintaining individual swarms requires a considerable amount of work on the part of the beekeeper, the amount being substantially the same for each individual bee swarm. While hobbyists and other part-time beekeepers do not object to working with each individual bee swarm, this approach presents a burden to professional beekeepers because of the considerable amount of work involved. Accordingly, a system that saves work will be advantageous to the professional beekeeper who is interested in obtaining maximum honey output and/or breeding success with a minimum amount of work and time.

Best results in terms of honey output and breeding success are generally obtained from bee swarms which do not have the urge to swarm, because a swarm of bees or throng of bees preparing to swarm does not work efficiently. Swarming generally occurs due to the presence of an excess of nursing bees, i.e., ten to twelve day old bees. Swarming of bees can generally be prevented by removing 3 or 4 closed breeding combs, which include as many as these young nursing bees as is possible, soon after the bees begin to swarm; in this fashion the bee swarm loses its urge to swarm. This generally requires a great deal of time, however, because the breeding combs must be removed separately for each bee swarm. Additionally, the bees are disturbed to an undesireable degree when the combs are removed.

SUMMARY OF THE INVENTION

It is a general object of the present invention to provide a new and improved method and apparatus for economically maintaining and breeding bees within a large bee compound unit.

It is an additional object of the present invention to provide a new and improved method and apparatus or device which allows bee breeding and honey gathering to be achieved more economically.

Another object of the present invention is to prevent bees from swarming in a manner which requires a minimum amount of effort and work.

According to the present invention, a method for keeping and breeding bees economically within a bee compound is provided which maintains several queen bees completely separate within individual compartments which are selectively interconnectable to a central assembly chamber. Each of the compartments comprises a part of the overall compound unit and, accordingly, contains a swarm of bees having a single queen. The central assembly chamber provides the bees within individual compartments with the opportunity to congregate for feeding purposes.

Only one of the compartments is used to treat bees. Within this compartment, particularly when swarming begins or is about to begin, occupied breeding combs are removed and empty combs inserted in their place. Nursing bees from the remaining compartments of the compound unit when returning from feeding in the assembly chamber will move into the compartment which has the empty breeding combs.

The queen bees are retained within their respective compartments by a screen. The screen encloses the openings through which the other bees in each compartment can pass to enter the assembly chamber; the screen has a mesh large enough to allow these other bees to pass therethrough, but small enough to prevent the queen bee from slipping through.

Further, apparatus for achieving this method is proposed in accordance with the present invention. The apparatus includes several adjacent compartments each of which comprises a partial unit adopted to house one queen bee and an associated bee swarm or other bees apart from the larger bee compound. The apparatus also includes a central assembly chamber which the bees from each of the compartments have access to, so that bees from any one compartment can move via the assembly chamber into any of the other compartments. Adjacent compartments are separated by closed walls so that the bees cannot move directly into an adjacent compartment but only indirectly through the central chamber.

The breeding combs used in the present invention preferably are injection molded plastic combs having a central wall with cells positioned on opposite sides of the wall. The cells have pentagonal side walls of uniform height which are longitudinally slotted. The apparatus includes a central feeding area for the plurality of compartments within which bees from all of the compartments congregate, e.g., for feeding, and thereby become familiar with each other. Furthermore, by feeding the bees in a central area, good heat regulation is guaranteed for the entire system by arranging the central assembly chamber within or amidst the compartments. Additionally, only one compartment or, alternatively, only one swarm of bees will require attention during the summer, i.e., in order to prevent the urge to swarm among all of the bees. Occupied breeding combs will be taken from only one (preferably the same) compartment and empty combs corresponding in number to the occupied combs which are removed are inserted in their place. The empty combs are designed to be reoccupied by bees from the other compartments so that nursing bees from the other compartments returning from feeding will flow into the partly emptied compartment. Consequently, the beekeeper need work only in the one compartment.

If combs occupied by bees preparing to swarm are taken away from the one compartment to be treated and empty combs substituted in their place, bees from the remaining compartments fly via the assembly chamber into the partially empty compartment; the nearly empty compartment still houses the queen bee and a smaller number of other bees then existed originally; in this manner it can be filled very quickly. This procedure can be repeated several times, as necessary or desired. The removed bee combs then form part of a unit which is to be newly built, e.g., four of these removed portions can be used to form a new bee compound unit, which during the summer of the same year in which they are removed will grow into a full bee compound unit. Four partial units forming a bee compound is considered to be the most practical number of units from both breeding and structural standpoints.

The central assembly chamber is connected to all of the compartments (preferably four compartments are provided at an angle of 90° to each other) via slots, passages, or similar structure. A feeding chamber is provided below the central assembly chamber; this feeding chamber is provided so that bees within all of the four compartments will obtain their food at a central area. Because the bees are prevented from directly moving from one compartment into another by closing elements which are positioned between the slots communicating each compartment with the central assembly chamber and closed walls between adjacent compartments, the bees are forced to move into the feeding chamber via the common assembly chamber. This forces bees from different compartments to become familiar with and get used to one another so that an optimum delegation of work for the bees will be obtained. With the present invention it is possible to only treat one compartment, thereby leaving other compartments without treatment; this causes the bees within the non-treated compartments to remain undisturbed in their natural work and behavior, thereby providing an essential and important advantage of the present invention. Harmony between the bees within the individual compartments is not influenced or disturbed; and the bees are able to maintain daily rhythm and operation without outside disturbance.

The bees within the non-treated compartments do not develop the urge to swarm, because as soon as the urge arises within an individual compartment, breeding combs in the treated compartment are removed; in this manner the bees within the comb which would otherwise naturally begin to swarm are, instead, given another job. Generally, one third of the nursing bees are busy feeding the breed and two thirds of the nursing bees are preparing for swarming. In the present invention, the nursing bees that are determined to swarm are guided into the emptied, treated compartment and are given a job which they would otherwise perform only if swarming were complete. In this fashion the nursing bees do not get feeding juice and are therefore given continuous and/or useful work. The work is provided for them within the substantially empty compartment in which a queen bee remains, together with a few other bees.

The swarming desire of the bees is thereby prevented and the energy otherwise used for swarming is no longer wasted but instead used for a more useful purpose, i.e., breeding young bees, making honey and other useful jobs. As one example, the bees which are prevented from swarming are prepared to produce wax in a continuous fashion in order to close the slots which exist within the plastic combs with the wax.

With conventional wax coated plastic combs, wherein the sidewalls of the cells are of reduced height, bees initially build up the side walls with wax to their full height of the cell walls. Wax from the wax coating on conventional combs is utilized by the bees during this build-up; and the bees retain their own wax until swarming is possible. At that time, they use their own wax for building additional cells. This problem does not arise when using the present invention because swarming is prevented. Accordingly, wax coated combs are not necessary because the bees use their own wax to complete the combs by filling in the slots purposely molded in the combs.

Further, the large bee compound allows breeding of queen bees to begin early. Normally, early breeding of queen bees is prevented because the number of nursing bees available is not sufficient, whereas with the present invention, a bee compound unit having four partial units permits the gathering of four times the number of nursing bees.

The plastic comb preferably used in the present invention is injection molded from plastic material to the full height of its central cell wall and is sufficiently stiff so that a stiffening frame is not required. The stability of the plastic combs is increased by staggering the cells along both sides of the center wall. The individual plastic combs are suspended from means made from plastic material and provided along corresponding walls so that they are interchangeable.

The plastic cells of the comb can be used only in connection with the method and apparatus of the present invention, because the slots provided in individual cells would not otherwise be completed in continuous fashion by the bees. Using plastic combs of the present invention with normal bee swarms would result in the slots being closed by bees with wax appropriately two times within a given season, but not continuously, i.e., eight to ten times, as is the case with the present device. The shape of the combs is preferably square, because an extended rectangularly shaped comb results in the bees selecting their feeding place within the combs along one of the short comb sides; in this fashion, they are crowded together in a circular manner over the remaining part of the comb and remain there at a temperature of approximately 34° C. even when the temperature outside is less, e.g., 20° C. When the bees leave this warm area they select a path which does not lead to the combs through the feeding place. The movement of bees when extended rectangularly shaped combs are used is either upward or downward, not in the direction of the openings into the assembly chamber. If the combs are formed with a substantially square shape, however, food deposits are obtained in the upper area of the comb, so that if the bees move laterally they will directly encounter the openings which lead into the assembly chamber.

A further advantage of the present invention lies in the avoidance or minimization of bee losses during the low temperatures of winter, which losses can approximate 30% of a bee swarm. This is due to the automatic exchange of bees within individual compartments which is obtained by the present method and apparatus and because the bees thereby prevent losses which would otherwise occur. This is an extremely important technical advance for professional bee keepers.

The method of the present device is generally performed in early spring, i.e., as long as the bee swarms are developing a compartment will be emptied. The bees from each comb are swept into a collecting box. Only the queen bees with some hundred bees remain within the partially emptied compartment. Surplus nursing bees from other compartments enter the compartment through the openings, so that after a few minutes, the partly emptied compartment will be occupied by bees. This procedure is repeated approximately every fortnight over a period of approximately three months. The bees which are swept into the collecting box initially form small bee units having freshly batched young queen bees, the queen bees having been previously bred. Subsequently, when the compartment of bees is emptied, new swarms of bees are formed with young queen bees, which by then have been fertilized. The honey area is immediately free for these bees. The strong bee swarms which are formed in this fashion with the young queen bees can then be immediately sold as fresh bee swarms.

Accordingly, by using the method provided herein, approximately 75% of the time previously spent dealing with swarming bees can be eliminated; and additionally, between approximately 50 and 70% more bees will be produced, which either can be sold or used for producing honey. Further, the bees will do approximately twice the amount of work that they would otherwise do because they will not waste energy by swarming.

BRIEF DESCRIPTION OF THE DRAWINGS

The above and other objects, features and advantages of the present invention will become more fully apparent to those of ordinary skill in the art to which this invention pertains, from the following detailed description, when considered in connection with the accompanying drawings in which like reference characters designate like or corresponding parts throughout the several views, and wherein:

FIG. 2 is an enlarged cross-sectional view of the apparatus taken along line I—I of FIG. 1 and including one comb on each side of the central chamber of the apparatus;

DETAILED DESCRIPTION OF THE DRAWINGS

Figure 1:
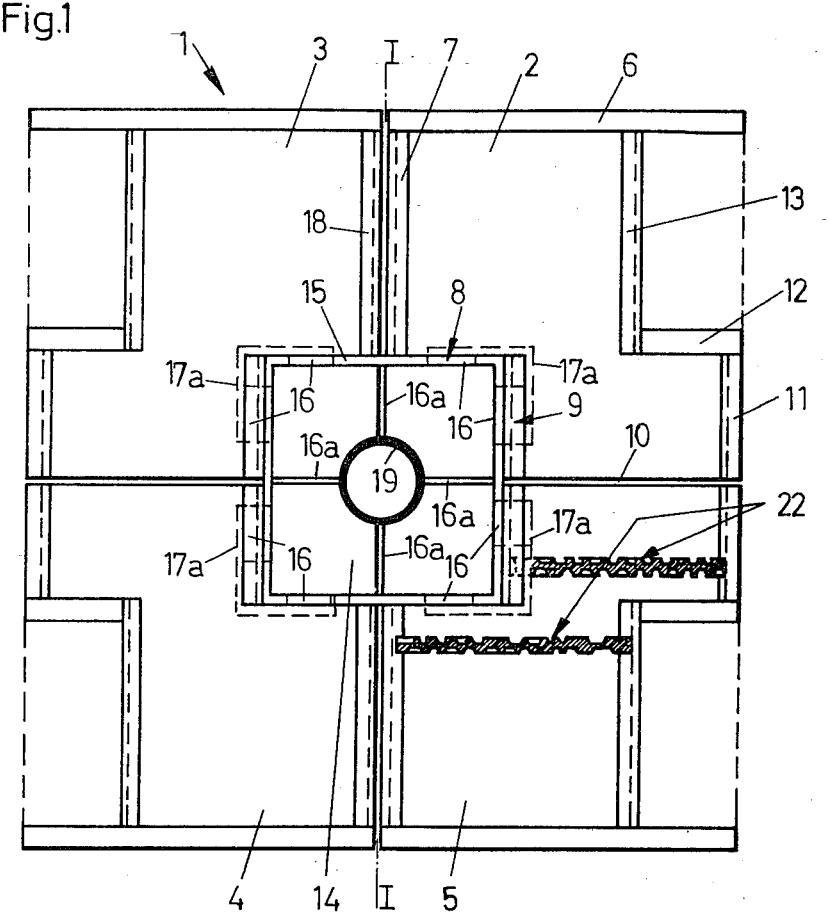
FIG. 1 is a schematic plan view of the apparatus formed in accordance with the present invention.

The beehive compound unit 1 shown in FIG. 1 comprises a plurality of identical or symmetrically identical compartments, e.g., compartments 2, 3, 4 and 5. The compartments are joined to one another and have one corner in common with an adjacent compartment. The compartments together form a generally square overall unit; each compartment is bounded by lateral walls 6, 7, 8, 9, 10, 11, 12 and 13. The individual compartments abut adjacent compartments along one side and are arranged about central assembly chamber 14, as shown in FIG. 2. The central chamber is formed, enclosed or bounded by inner walls 8 and 9. A continuous annular gap 15, in the form of a ring, is provided between assembly chamber 14 and walls 8 and 9. The gap is connected to the interior of all of the compartments via openings or slots 16, as seen in FIGS. 1 and 2. Bees move from compartments 2 through 5, through slots 16 and gap 15 into assembly chamber 14. From the central assembly chamber they can move into another compartment, e.g., 3, 4 or 5. They must move into the chamber, between adjacent compartments is closed by closing element 16a or similar structure which extends vertically from the top of the apparatus to the assembly chamber. Slots 16 can be selectively closed by bars or other similar elements 17 so that if one of the compartments is to be removed from unit 1, a corresponding compartment can be closed by the bar to prevent bees from escaping. Closing screens 17a are provided at openings 16, e.g., along the outer sides of the openings. These screens have a mesh which is large enough so that most of the bees can slip through the screen without difficulty yet mesh small enough to prevent a queen bee from slipping through. In this fashion the queen bees are maintained separately in each compartment. Latches or other latch-like elements 18 are provided on opposed inner and outer compartment walls, which extend parallel to one another. Plastic combs 22 are suspended from the latches.

Central tube 19 leads into feeding container 20 and extends through the assembly chamber; this feeding container or chamber is intended to be used by bees from all of the compartments in the unit as the feeding area. The feeding container is supplied with food via tube 19 from above; a closing element can be provided adjacent the top of the tube to close it off from its surroundings.

Openings or slots 16 are provided within walls 8 and 9 of the individual compartments about the assembly chamber. Inner walls 8 and 10 of the individual compartments are relatively thin in order to obtain optimum heat transfer between the compartments and assembly chamber 14. Inner walls 7 and 9 are also thin; these are provided with latches in order to support the plastic combs. Alternately, as illustrated in FIG. 2, walls 7 and 9 can be formed relatively thicker and are provided with recesses 18' at their upper ends for suspending comb supporting elements 21.

FIG. 2 generally represents a cross-section of the unit shown in FIG. 1. It is a slightly modified cross-section, however, in which latches 18 at the upper end of the walls are provided with recesses 18'.

Outer walls 6, 11, 12, and 13 of the compartments are formed from relatively good heat insulating material and have a relatively large diameter in order to prevent heat from escaping from the compartments. As one example, foam plastic material is covered with metal sheet material on both its inner and outer surfaces to prevent bees from eating the plastic material; inner or intermediate compartment walls, e.g., walls 10, are formed from a material having a low resistance against heat balance, i.e., enhancing heat transfer between the individual compartments, e.g., plywood.

Compound unit 1 is a bee breeding unit. At the top of the breeding unit, a honey unit can be arranged corresponding to the dimensions of the breeding unit; the honey unit is removeable and can be separated from the breeding unit by a closing floor.

Figure 4:
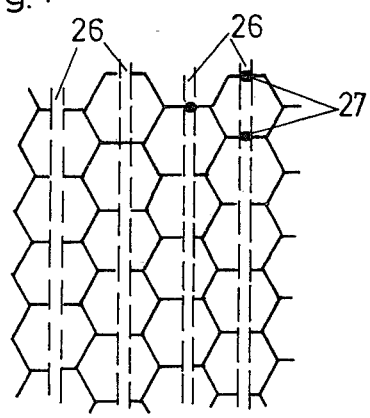
FIG. 4 is an enlarged plan view of a portion of the comb of FIG. 3.
Figure 3:
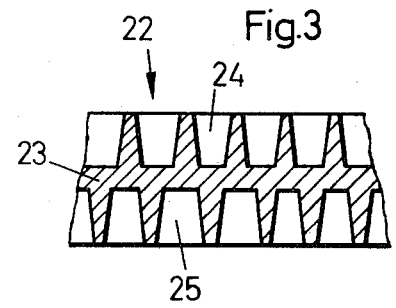
FIG. 3 is an enlarged plan view of a comb used with the apparatus of FIG. 1.

Plastic combs 22 have a central wall and cells which extend over the entire center wall height. The combs are injection molded from plastic material. The combs include cells 24 having full cell wall heights which extend outwardly from both sides of center wall 23. Because it is relatively difficult to produce plastic combs having full cell wall heights by injection molding, two opposed walls of each cell are slotted at 26, as illustrated in FIG. 4. In this fashion, the combs can be injection molded without difficulty. The bees build up slots 26 with their own wax 27. Additionally, the cells on opposed sides of the center wall are staggered by an amount equal to half of the distance between adjacent cells to enhance the stability of the comb. Although not illustrated, other comb configurations could be used; the illustrated comb, however, is highly durable, easy to use and quite suitable for the present device.

The method and apparatus for economically keeping and breeding bees within a large compound unit utilize a central chamber for both feeding the bees and for permitting communication between a plurality of compartments in which the bees are maintained. In this fashion the bees can indirectly move from one compartment to another when desired. Because of this intercommunication, the bees can be treated, e.g., divided and otherwise cared for, in only one of the compartments, as many of the bees in other compartments will move towards this one compartment when an empty honeycomb replaces an occupied breeding comb. This reduces the amount of work required by beekeepers and leads to increases in honey output and breeding success.

From the foregoing description, one skilled in the art can easily ascertain the essential characteristics of this invention, and without departing from the spirit and the scope thereof, can make various changes and modifications of the invention to adapt it to various usages and conditions.

What is claimed is:

1. A method for economically maintaining and breeding bees within a bee compound unit, the compound unit being subdivided into a plurality of compartments, each compartment maintaining one queen bee and nursing bees therein, the compartment surrounding a single combination assembly and feeding chamber which is accessible to all of the compartments and provides communication therebetween, said method comprising maintaining said queen bees in said compartments such that they are prevented from leaving their respective compartments, permitting nursing bees to move between said compartments, feeding said nursing bees in said single chamber, treating said bees by removing breeding combs with nursing bees from one of said compartments when said nursing bees begin to swarm, leaving the queen bee within said one compartment, and replacing said breeding combs with empty combs, whereby the urge of bees in all of the other compartments to swarm will be minimized by the passage of nursing bees from said other compartments into said one compartment.

2. Apparatus for economically maintaining and breeding bees comprising: a bee compound unit subdivided into a plurality of separate, adjacent compartments, each of said compartments adapted to house a queen bee and nursing bees; a central assembly and feeding chamber having a plurality of passages respectively connected to the compartments and arranged so that said nursing bees positioned in each of said compartments can move indirectly to any other of said compartments via the assembly and feeding chamber; means for preventing each queen bee in a given compartment from moving into another compartment; and walls between the adjacent compartments for preventing bees in one compartment from moving directly to another compartment, whereby only one compartment is used to treat bees from all of the compartments by removing swarming bees from said one compartment.

3. Apparatus in accordance with claim 2 wherein the bee compound unit consists of four compartments which surround said assembly chamber.

4. Apparatus in accordance with claim 2 wherein said compartments are identical.

5. Apparatus in accordance with claim 2 wherein said compartments are symmetrically identical.

6. Apparatus in accordance with claim 2 wherein said feeding chamber is positioned beneath said assembly chamber.

7. Apparatus in accordance with claim 6 wherein said compartments comprise walls adjacent to said assembly chamber and wherein an annular chamber is provided as a continuous path between said walls and said assembly chamber, said annular chamber being connected to said feeding chamber.

8. Apparatus in accordance with claim 7 wherein said walls adjacent to said assembly chamber comprise path restriction walls interrupted by slots or openings.

9. Apparatus in accordance with claim 8 wherein locking means are provided for selectively closing said openings.

10. Apparatus in accordance with claim 9 wherein said assembly chamber is provided with a filling tube extending into said feeding chamber.

11. Apparatus in accordance with claim 10 further comprising a closing element positioned about said filling tube.

12. Apparatus in accordance with claim 9 wherein said means for preventing movement of each queen bee comprises a closing mesh screen positioned over said slots or openings, the mesh of said screen being large enough such that said nursing bees can pass through, yet small enough such that the queen bees cannot pass through.

13. Apparatus in accordance with claim 2, wherein each of said compartments includes opposed walls separated from each other by the same, uniform distance, said walls being provided with means for supporting combs.

14. Apparatus in accordance with claim 13 wherein said support means comprise extensions.

15. Apparatus in accordance with claim 13 wherein said support means comprise latches.

16. Apparatus in accordance with claim 13 wherein said support means comprise recesses.

17. Apparatus in accordance with claim 2 wherein said compartments comprise relatively thick outer walls for improving insulation and relatively thin inner walls for permitting good heat exchange between adjacent inner walls.

18. Apparatus in accordance with claim 2 wherein each of said compartments comprise a plurality of walls and all of said walls are plastic.

19. Apparatus in accordance with claim 2 wherein each of said compartments is adapted to receive at least one comb, said comb being injection molded of plastic material and having a central wall and cells which extend over the entire height of said central wall.

20. Apparatus in accordance with claim 19 wherein said cell walls comprise a plurality of slots which the bees can close with their own wax.

21. Apparatus in accordance with claim 19 wherein said cells are provided on both sides of said central wall and wherein the cells on one side of said wall are staggered or offset from the cells on the other side of said wall.

22. Apparatus in accordance with claim 21 wherein said cells on one side of said wall are offset from the cells on the other side of said wall by approximately half the distance between adjacent cells.

* * * * *

UNITED STATES PATENT AND TRADEMARK OFFICE
CERTIFICATE OF CORRECTION

PATENT NO. : 4,332,045
DATED : June 1, 1982
INVENTOR(S) : Matthias SCHMIDT

It is certified that error appears in the above-identified patent and that said Letters Patent is hereby corrected as shown below:

In Col. 4, line 36, delete "." after $34^\circ$ C.

Signed and Sealed this

Fourteenth Day of September 1982

[SEAL]

*Attest:*

GERALD J. MOSSINGHOFF

*Attesting Officer*     *Commissioner of Patents and Trademarks*